United States Patent
Hu et al.

(10) Patent No.: US 10,841,913 B2
(45) Date of Patent: Nov. 17, 2020

(54) METHOD AND DEVICE FOR DETERMINING GUARD PERIOD, TERMINAL, AND STORAGE MEDIUM

(71) Applicants: CHINA MOBILE COMMUNICATION LTD., RESEARCH INSTITUTE, Beijing (CN); CHINA MOBILE COMMUNICATIONS CORPORATION, Beijing (CN)

(72) Inventors: Lijie Hu, Beijing (CN); Liang Xia, Beijing (CN); Lu Han, Beijing (CN)

(73) Assignees: China Mobile Communications Corporation, Beijing (CN); China Mobile Communication Ltd., Research Institute, Beijing (CN)

( * ) Notice: Subject to any disclaimer, the term of this patent is extended or adjusted under 35 U.S.C. 154(b) by 0 days.

(21) Appl. No.: 16/095,327

(22) PCT Filed: Feb. 22, 2017

(86) PCT No.: PCT/CN2017/074463
§ 371 (c)(1),
(2) Date: Oct. 19, 2018

(87) PCT Pub. No.: WO2017/181770
PCT Pub. Date: Oct. 26, 2017

(65) Prior Publication Data
US 2019/0141680 A1 May 9, 2019

(30) Foreign Application Priority Data
Apr. 20, 2016 (CN) .......................... 2016 1 0249258

(51) Int. Cl.
*H04L 12/801* (2013.01)
*H04L 5/14* (2006.01)
(Continued)

(52) U.S. Cl.
CPC .......... *H04W 72/042* (2013.01); *H04L 5/0051* (2013.01); *H04W 72/0446* (2013.01); *H04W 72/12* (2013.01)

(58) Field of Classification Search
CPC .............. H04W 72/042; H04W 72/12; H04W 72/0446; H04L 5/0051
See application file for complete search history.

(56) References Cited

U.S. PATENT DOCUMENTS 5,625,886 A * 4/1997 Raes ..................... H04W 84/08
455/519
8,457,032 B2 6/2013 Suo et al.
(Continued)

FOREIGN PATENT DOCUMENTS

CN 101425844 A 5/2009
CN 102811191 A 12/2012
(Continued)

OTHER PUBLICATIONS

International Search Report issued in PCT/CN2017/074463, dated May 4, 2017.
(Continued)

*Primary Examiner* — Faruk Hamza
*Assistant Examiner* — Abusayeed M Haque
(74) *Attorney, Agent, or Firm* — BakerHostetler

(57) ABSTRACT

A method for determining a Guard Period (GP), including: after a terminal side accesses a cell, receiving, by the terminal side, at least one of the following information sent by a network side: a duration of an uplink service, a duration of a downlink service or a time length of a GP; determining, by the terminal side, a duration for sending the uplink service and a duration for receiving the downlink service according to the information; and sending, by the terminal side, the uplink service according to the duration of the
(Continued)

uplink service, or receiving the downlink service according to the duration of the downlink service. A corresponding terminal and a corresponding non-transitory storage medium are also provided.

14 Claims, 9 Drawing Sheets

(51) Int. Cl.
*H04L 29/06* (2006.01)
*H04L 1/00* (2006.01)
*H04W 72/04* (2009.01)
*H04W 72/12* (2009.01)
*H04L 5/00* (2006.01)

(56) References Cited

U.S. PATENT DOCUMENTS

| | | | |
|---|---|---|---|
| 9,155,084 B2 | 10/2015 | Wang et al. | |
| 9,532,369 B2 | 12/2016 | Susitaival et al. | |
| 9,549,397 B2 | 1/2017 | Wang et al. | |
| 2010/0238847 A1 | 9/2010 | Suo et al. | |
| 2012/0008511 A1* | 1/2012 | Fan | H04J 11/0036 370/252 |
| 2013/0016649 A1* | 1/2013 | Damnjanovic | H04W 88/04 370/315 |
| 2013/0021932 A1* | 1/2013 | Damnjanovic | H04W 52/0229 370/252 |
| 2014/0092880 A1 | 4/2014 | Wang et al. | |
| 2014/0198773 A1* | 7/2014 | Yin | H04L 5/001 370/336 |
| 2014/0307662 A1 | 10/2014 | Zheng et al. | |
| 2015/0043392 A1 | 2/2015 | Susitaival et al. | |
| 2015/0373697 A1 | 12/2015 | Wang et al. | |
| 2016/0044663 A1 | 2/2016 | Yao et al. | |
| 2016/0212711 A1* | 7/2016 | Yi | H04W 52/281 |
| 2016/0330737 A1 | 11/2016 | Takeda et al. | |
| 2016/0337987 A1* | 11/2016 | Yi | H04W 52/34 |
| 2017/0013564 A1* | 1/2017 | Yi | H04W 52/146 |
| 2017/0311200 A1* | 10/2017 | Koskinen | H04W 76/27 |
| 2018/0035242 A1* | 2/2018 | Yi | H04L 5/0037 |
| 2018/0069593 A1* | 3/2018 | Yi | H04B 1/707 |
| 2019/0223175 A1* | 7/2019 | Hakola | H04W 72/0446 |

FOREIGN PATENT DOCUMENTS

| | | |
|---|---|---|
| CN | 103516468 A | 1/2014 |
| CN | 103563273 A | 2/2014 |
| EP | 2779748 A1 | 9/2014 |
| EP | 3096578 A1 | 11/2016 |
| WO | 2013141770 A1 | 9/2013 |
| WO | 2014161174 A1 | 10/2014 |
| WO | 2015108007 A1 | 7/2015 |

OTHER PUBLICATIONS

English translation of Written Opinion issued in PCT/CN2017/074463, dated May 4, 2017.
Extended Search Report issued in European Application No. 17785256.3, dated Feb. 26, 2019.

* cited by examiner

METHOD AND DEVICE FOR DETERMINING GUARD PERIOD, TERMINAL, AND STORAGE MEDIUM

CROSS-REFERENCE TO RELATED APPLICATIONS

The present application is a National Stage of International patent application PCT/CN2017/074463, filed on Feb. 22, 2017, which claims priority to Chinese Patent Application No. 201610249258.4, filed on Apr. 20, 2016, the disclosures of which are incorporated by reference in their entirety.

TECHNICAL FIELD

The disclosure relates to a sub-frame configuration technology, in particular to a method and device for determining a Guard Period (GP) and a terminal and a storage medium.

BACKGROUND

A Long Term Evolution (LTE) system and an LTE-Advanced (LTE-A) system thereof of the 3rd Generation Partnership Project (3GPP) may work based on two modes, one of which is Frequency Division Duplexing (FDD) mode (FDD LTE), and the other is Time Division Duplexing (TDD) mode (TD-LTE). As shown in FIG. 2, the FDD LTE corresponds to frame structure type 2, that is, a downlink transmission and an uplink transmission are carried on paired frequency spectrum, and they adopt FDD, thereby avoiding a band interference between them. As shown in FIG. 2, the TDD LTE corresponds to frame structure type 2, that is, the downlink transmission and the uplink transmission are carried at the same frequency point, and they adopt TDD, thereby avoiding a time slot interference between them.

With the development of communication technologies, an increasing number of new frame structures are presented. For example, the frame structures of TDD and FDD are merged, and such a new merged frame structure is discussed extensively. As shown in FIG. 3, a sub-frame includes both a downlink time slot for a downlink transmission and an uplink time slot for an uplink transmission, and further includes a GP between the uplink time slot and the downlink time slot. Such a frame structure is similar to a configuration of a special time slot, but a duration of uplink and downlink may be configured flexibly. On the other hand, with the development of communication technologies, the emergence of services with a low delay may further shorten the duration of a symbol.

In a special sub-frame of the LTE, an Uplink Pilot Time Slot (UpPTS) is used for sending data of a Physical Random Access Channel (PRACH) and/or a channel Sounding Reference Signal (SRS) instead of being used for sending data of a Physical Uplink Shared Channel (PUSCH). For a cell with a large coverage distance, it is needed to set a configuration of the special sub-frame for the GP with a large time length. Because the UpPTS is not used for sending service data, for a configuration where an UpPTS area supports a maximum number of two basic symbols, there is no loss of an uplink capacity caused. In the future design of frame structure, in consideration of the diversity of service types, when the duration of the basic symbol is shortened, if all User Equipment (UE) needs to keep a large GP in the case of the cell with a large coverage radius, a waste of resources is caused.

SUMMARY

In view of this, for solving at least one problem in the conventional art, embodiments of the disclosure provide a method and device for determining a GP, and a terminal and a storage medium, which may dynamically adjust a duration of an uplink or downlink transmission, thereby making full use of resources, and further avoiding a waste of resources.

The technical solutions of the embodiments of the disclosure are implemented as follows.

In a first aspect, the embodiments of the disclosure provide a method for determining a GP. The method includes the following operations.

A network side determines, according to information indicating a location of UE, a time length of a GP for the UE.

The network side determines, on the basis of the time length of the GP of the UE, a duration of an uplink or downlink service in a sub-frame.

The network side notifies the UE of at least one of the following information: the duration of the uplink service, the duration of the downlink service or the time length of the GP.

In a second aspect, the embodiments of the disclosure provide a device for determining a GP. The device includes a first determining unit, a second determining unit and a notifying unit.

The first determining unit is configured to determine, according to the information indicating the location of the UE, the time length of the GP for the UE.

The second determining unit is configured to determine, on the basis of the time length of the GP of the UE, the duration of the uplink or downlink service in the sub-frame.

The notifying unit is configured to notify the UE of at least one of the following information: the duration of the uplink service, the duration of the downlink service or the time length of the GP.

In a third aspect, the embodiments of the disclosure provide a method for determining a GP. The method includes the following operations.

After accessing a cell, a terminal side receives at least one of the following information sent by the network side: the duration of the uplink service, the duration of the downlink service or the time length of the GP.

The terminal side determines, according to the information, a duration of an uplink time slot for sending the uplink service and a duration for receiving the downlink service.

The terminal side sends the uplink service according to the duration of the uplink service, or receives the downlink service according to the duration of the downlink service.

In a fourth aspect, the embodiments of the disclosure provide a terminal. The terminal includes a receiving unit, a fourth determining unit and a processing unit.

The receiving unit is configured to, after accessing the cell, receive at least one of the following information sent by the network side: the duration of the uplink service, the duration of the downlink service or the time length of the GP.

The fourth determining unit is configured to determine, according to the information, the duration of the uplink time slot for sending the uplink service and the duration for receiving the downlink service.

The processing unit is configured to send the uplink service according to the duration of the uplink service, or receive the downlink service according to the duration of the downlink service.

In a fifth aspect, the embodiments of the disclosure provide a computer storage medium. A computer executable instruction is stored in the computer storage medium.

The computer executable instruction is configured to execute the method for determining a GP provided in the first aspect and the second aspect of the disclosure.

In a sixth aspect, the embodiments of the disclosure provide a device for determining a GP. The device includes: a first processor and a first storage medium for storing executable instructions. The first processor is configured to execute the stored executable instructions. The executable instructions include the following operations.

The time length of the GP is determined for the UE according to the information indicating the location of the UE.

The duration of the uplink or downlink service in the sub-frame is determined on the basis of the time length of the GP of the UE.

At least one of the following information is notified to the UE: the duration of the uplink service, the duration of the downlink service or the time length of the GP.

In a seventh aspect, the embodiments of the disclosure provide a terminal. The terminal includes: a second processor and a second storage medium for storing the executable instructions. The second processor is configured to execute the stored executable instructions. The executable instructions include the following operations.

After the terminal accesses the cell, at least one of the following information sent by the network side is received: the duration of the uplink service, the duration of the downlink service or the time length of the GP.

The duration of the uplink time slot for sending the uplink service and the duration for receiving the downlink service are determined according to the information.

The uplink service is sent according to the duration of the uplink service, or the downlink service is received according to the duration of the downlink service.

According to the method and device for determining a GP, and the terminal and the storage medium, the network side determines, according to the information indicating the location of the UE, the time length of the GP for the UE, the network side determines, on the basis of the time length of the GP of the UE, the duration of the uplink or downlink service in the sub-frame, and the network side notifies the UE of at least one of the following information: the duration of the uplink service, the duration of the downlink service or the time length of the GP; in such a manner, the duration of the uplink or downlink transmission may be adjusted dynamically, thereby making full use of resources, and further avoiding a waste of resources.

DETAILED DESCRIPTION

Figure 1:
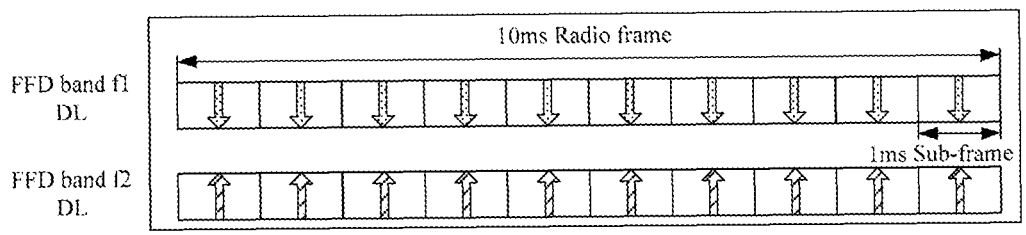
FIG. 1 is a schematic diagram of a FDD LTE frame structure in the related art.
Figure 2:
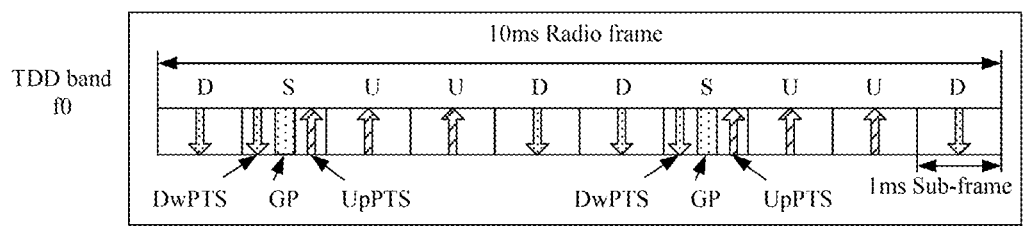
FIG. 2 is a schematic diagram of a TD-LTE frame structure in the related art.
Figure 3:
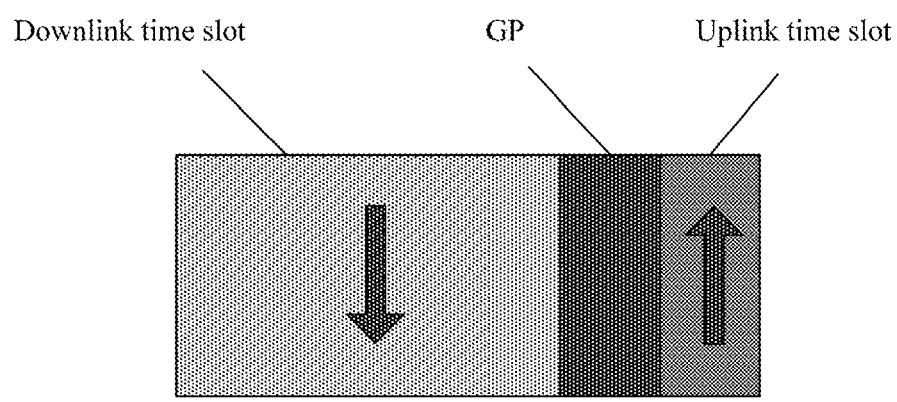
FIG. 3 is a schematic diagram of a self-contain frame structure in the related art.

Generally, an LTE system adopts a sub-frame structure of equal length. For example, each sub-frame is 1 ms, that is, each sub-frame includes two time slots of 0.5 ms, and ten sub-frames form a radio frame of 10 ms. The difference between the FDD LTE and the TD-LTE is that a special sub-frame is introduced in the TD-LTE. The special sub-frame is composed of a Downlink Pilot Time Slot (DwPTS), a GP and an UpPTS. The sub-frame marked as S in FIG. 2 is a tween sub-frame of a downlink sub-frame and an uplink sub-frame. The GP is used for completing switching from downlink to uplink. The size of the GP is related to a coverage distance of a cell. The larger the coverage distance of the cell, the larger the GP; the smaller the coverage distance of the cell, the smaller the GP. A value of the GP is determined mainly by a transmission delay and a transmitting-receiving switching delay of UE, referring to the formula (0-1):

$$GP = 2 \times \text{transmission delay} + T_{RX \to Tx} \quad (0\text{-}1).$$

In the formula (0-1), the transmission delay is the time required for travelling at the speed of light in the coverage distance of the cell, the $T_{RX \to Tx}$ is the time that the UE (also called a terminal) switches from a downlink reception to an uplink transmission, and is usually a fixed value related to hardware of the UE.

In the LTE system, configurations of multiple special time slots are supported, respectively corresponding to different values of the DwPTS, the GP and the UpPTS. As shown in Table 1, a configuration of the special sub-frame is broadcast to all the UE through a system message (System Information Block (SIB) message), and all the UE determines durations of the special sub-frames DwPTS, the GP and the UpPTS according to the configuration broadcast by a base station. Different GP lengths may correspond to different coverage distances of the cell. In Table 1, CP represents a Cyclic Prefix (CP).

TABLE 1

| Configuration of special sub-frame | | | | | | |
|---|---|---|---|---|---|---|
| Configuration of special | Conventional CP | | | Extended CP | | |
| sub-frame | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | 5 | 5 | 2 |
| 8 | 11 | 1 | 2 | — | — | — |
| 9 | 6 | 6 | 2 | — | — | — |

In the following embodiments of the disclosure, when the UE accesses the cell, what is read is a configuration of a cell specific time length of the GP. Then, the base station configures a UE specific GP length for the UE on the basis of information indicating a location of the UE, for example, on the basis of the location information the UE or information about Timing Advance (TA). The base station dynamically adjusts a duration of an uplink or downlink service in a sub-frame on the basis of the UE specific GP length. The base station notifies the UE of the duration of the service or the time length of the GP configured. The UE performs the corresponding uplink and downlink transmissions according to the configurations of the base station.

The technical solutions are further described in detail below in combination with the accompanying drawings and the specific embodiments.

First Embodiment

For solving the above problem, the present embodiment of the disclosure provides a method for determining a GP. The method is applied to a network side, for example, a network device (base station). The functions realized by the method may be implemented by calling program codes by a processor in the network device. Of course, the program codes may be stored in a computer storage medium. It is apparent that the network device at least includes a processor and a storage medium.

Figure 4:
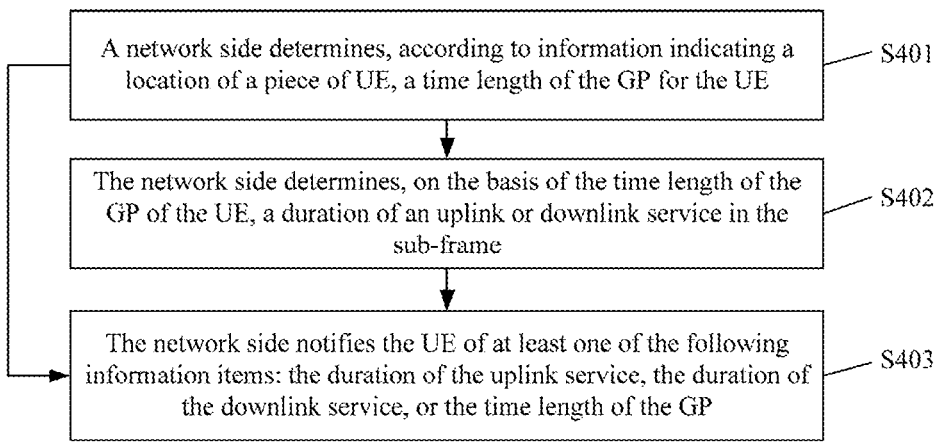
FIG. 4 is a flowchart of a method for determining a GP in a first embodiment of the disclosure.

FIG. 4 is a flowchart of the method for determining a GP in a first embodiment of the disclosure. As shown in FIG. 4, the method includes the following operations.

At S401, the network side determines, according to information indicating a location of UE, a time length of a GP for the UE.

At S402, the network side determines, on the basis of the time length of the GP of the UE, the duration of the uplink or downlink service in the sub-frame.

At S403, the network side notifies the UE of at least one of the following information: the duration of the uplink service, the duration of the downlink service or the time length of the GP.

In other embodiments of the disclosure, the operation that the network side determines, on the basis of the time length of the GP of the UE, the duration of the uplink or downlink service in the sub-frame may include: the network side determines, on the basis of the time length of the GP of the UE, a time length of an uplink time slot or a time length of a downlink time slot in the sub-frame; correspondingly, the network side notifies the UE of the time length of the uplink time slot, or the time length of the downlink time slot or the time length of the GP.

The operation that the network side determines, on the basis of the time length of the GP of the UE, the time length of the uplink time slot or the time length of the downlink time slot in the sub-frame may include: the network side determines that the time lengths of the downlink time slots are the same and time sequences of the downlink time slots are aligned; and the network side determines the time length of the uplink time slot according to the time length of the GP, the total time length of the sub-frame and the time length of the downlink time slot.

The operation that hat the network side determines, on the basis of the time length of the GP of the UE, the time length of the uplink time slot or the time length of the downlink time slot in the sub-frame may include: the network side determines that the time lengths of the uplink time slots are the same and time sequences of the uplink time slots are aligned; and the network side determines the time length of the downlink time slot according to the time length of the GP, the total time length of the sub-frame and the time length of the uplink time slot.

In other embodiments of the disclosure, the operation that the network side determines, according to the information indicating the location of the UE, the time length of the GP for the UE may include: the network side determines the time length of the GP according to the location information, or the information about TA or measurement feedback information of the UE.

In other embodiments of the disclosure, the time length of the GP is represented by the number of consecutive symbols or a proportion. The method further includes that: the proportion is determined according to a communication standard or a customized rule.

In other embodiments of the disclosure, the operation that the network side notifies the UE of at least one of the following information includes the following operations.

The network side dynamically indicates the information to the UE by N bits added in a control channel; the N bits are used for carrying at least one of the following information: the duration of the uplink service, the duration of the downlink service or the time length of the GP; or the network side indicates the information to the UE through semi-static signaling; the semi-static signaling carries at least one of the following information: the duration of the uplink service, the duration of the downlink service or the time length of the GP.

In the present embodiment of the disclosure, the network side determines, according to the information indicating the location of the UE, the time length of the GP for the UE, the network side determines, on the basis of the time length of the GP of the UE, the duration of the uplink or downlink service in the sub-frame, and the network side notifies the UE of at least one of the following information: the duration of the uplink service, the duration of the downlink service or the time length of the GP; in such a manner, the duration of the uplink or downlink transmission may be adjusted dynamically, thereby making full use of resources, and further avoiding a waste of resources.

Second Embodiment

In the present embodiment, downlink time sequences of the sub-frame are kept aligned, and uplink time sequences are dynamically adjusted according to the time length of the GP. For example, the UE the downlink transmission of which is called in the sub-frame keeps the downlink transmissions aligned on the time sequence, but viewed from the base station, the uplink transmissions are unaligned; and the durations of the uplink transmissions of the different UE are different. A corresponding GP length is reserved according to the length of GP that the base station configures for the UE, so that a more effective use of resources may be achieved.

Figure 5:
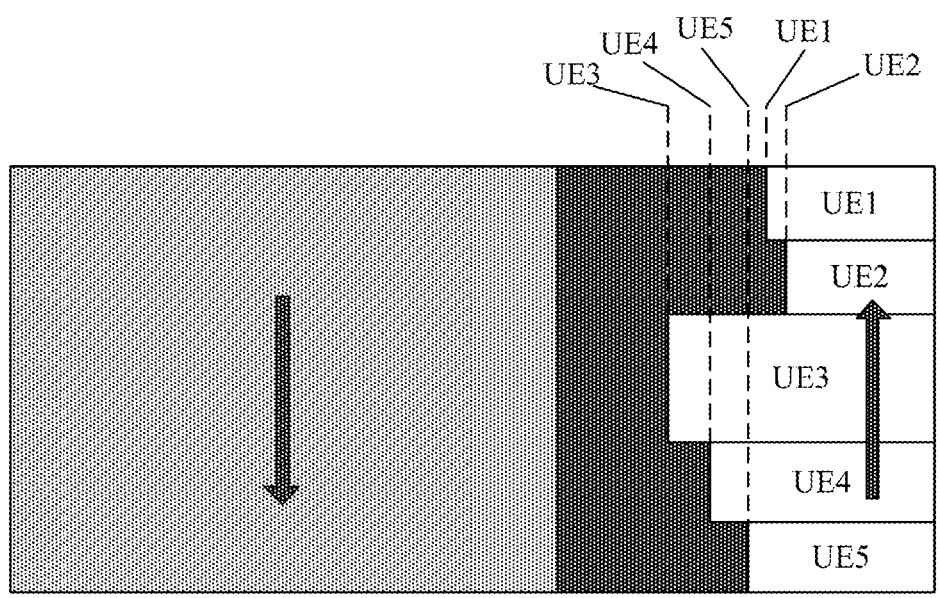
FIG. 5 is a schematic diagram of a frame structure in a second embodiment of the disclosure.

An elaboration is given below by taking examples. As shown in FIG. 5, because the time lengths of the downlink transmissions are the same, the time sequences of the downlink transmissions of 5 pieces of UE (UE1 to UE5) are aligned at two ends; however, the time sequences of the GPs of the 5 pieces of UE, namely UE1 to UE5, are aligned at one end, because the time lengths of the GPs of the 5 pieces of UE, namely UE1 to UE5, are different, the time sequences of the GPs of the 5 pieces of UE, namely UE1 to UE5, are unaligned at the other end. For the uplink transmission, the time sequences of the uplink transmissions are aligned on one end, because the time lengths of the uplink transmissions are different, the time sequences of the uplink transmissions are unaligned at the other end. It can be seen from above description that a corresponding GP length is reserved according to the length of the GP that the base station configures for the five pieces of UE, namely UE1 to UE5, so that a more effective use of resources may be achieved.

A method for determining a GP is provided below based on the embodiment shown in FIG. 5. The method includes the following operations.

At S501, when accessing the cell, the UE obtains a broadcast GP length from the network side.

When the UE accesses the cell, the network side sends the GP length to the UE, which may be implemented through a broadcast message in the implementation process. It is to be noted that the broadcast GP length in S501 is actually a default GP length configured by the base station. After the UE receives the broadcast GP length, if the UE is not intended to change the GP length, then the default GP length may be adopted; if the UE is intended to change the GP length, the process proceeds to S502. It is to be noted that whether to change the GP length may be determined according to a preset rule or the uplink service of the UE.

The length of the GP may be described by the number of consecutive symbols or a proportion (also called a ratio), which is because the total time length of the sub-frame composed of the uplink time slot, the downlink time slot and the GP is fixed. In the implementation process, the network side may include the base station. Of course, for those skilled in the art, the network side may also be realized by other network elements, which will not be repeated herein. By taking that the length of the GP is described by the ratio for example, the ratio may be determined by the base station; for example, the base station may determine the length of the GP based on a requirement for the maximum GP, or the base station determines the length of the GP according to the coverage distance of the cell.

At S502, the network side determines, according to location information of UE, the size of the GP that the UE needs to reserve.

The location information of the UE is not necessarily accurate location information. The location information of the UE may adopt the measurement feedback information of the UE or the information about the TA of the UE, so the network side may determine, on the basis of the measurement feedback information of the UE, the size of the GP reserved. The network side may also determine a value of the TA by using an existing method for determining TA, so that the size of the GP required at the current position of the UE is determined.

The measurement feedback information may be information indicating information about an uplink pilot and a downlink pilot measured by the UE.

At S503, the network side configures the time length of the GP or the ratio of downlink to GP to uplink for the UE.

The time length of the GP may be represented by the number of symbols. The ratio of downlink to GP to uplink may come from the existing ratio of the LTE, or may be a newly-defined ratio.

At S504, the network side indicates to the UE the time length of the GP or the ratio of downlink to GP to uplink by sending a signaling indication.

In the implementation process, the network side dynamically indicates the time length and the ratio to the UE by N bits added in the control channel, or indicates the time length and the ratio to the UE through semi-static signaling, for example, Radio Resource Control (RRC) signaling.

At S505, during the uplink transmission, the UE determines in real time a duration of an uplink transmission time domain according to the configuration of the network side.

After the UE accesses the cell, the terminal side receives at least one of the following information sent by the network side: the duration of the uplink service or the time length of the GP. The UE determines, according to the information, the duration of the uplink time slot for sending the uplink service. The terminal side sends the uplink service according to the duration of the uplink service.

In the present embodiment, aiming at each UE, the network side dynamically adjusts the GP length of each UE according to a requirement of the UE for the GP length, so different GP lengths may be adopted for the different UE in the cell.

Third Embodiment

In the present embodiment, the uplink time sequences of the sub-frame are kept aligned, a downlink scheduling time length (time length) is dynamically adjusted according to the length of the GP of uplink scheduling UE corresponding to a scheduled frequency domain position. For example, in the sub-frame, the uplink transmissions are aligned on the time sequence, but the downlink transmissions are unaligned; and the durations of the downlink transmissions of the different UE are different. The corresponding GP length is reserved according to the length of GP that the base station configures for the UE, so that a more effective use of resources may be achieved.

Figure 6:
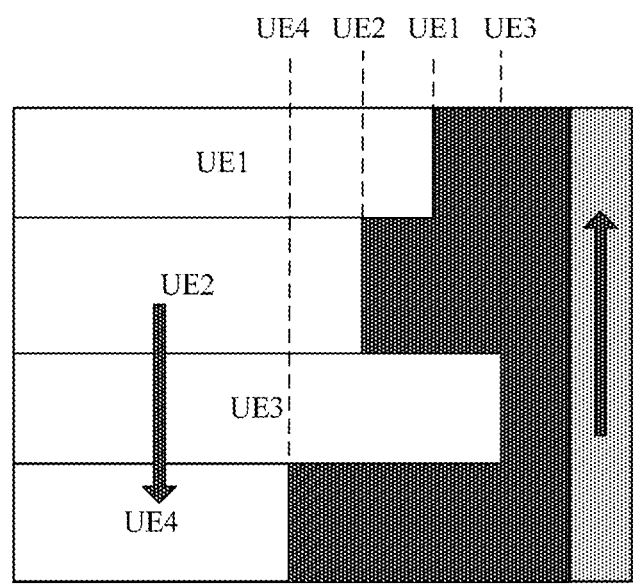
FIG. 6 is a schematic diagram of a frame structure in a third embodiment of the disclosure.

An elaboration is given below by taking examples. As shown in FIG. 6, because the time lengths of the uplink transmissions are the same, the time sequences of the uplink transmissions of four pieces of UE (UE1 to UE4) are aligned at two ends; however, the time sequences of the GPs of the four pieces of UE, namely UE1 to UE4, are aligned at one end, because the time lengths of the GPs of the four pieces of UE, namely UE1 to UE4, are different, the time sequences of the GPs of the four pieces of UE, namely UE1 to UE4, are unaligned at the other end. For the downlink transmission, the time sequences of the downlink transmissions are aligned on one end, because the time lengths of the downlink transmissions are different, the time sequences of the downlink transmissions are unaligned at the other end. It can be seen from above description that a corresponding GP length is reserved according to the length of the GP that the base station configures for the four pieces of UE, namely UE1 to UE4, so that a more effective use of resources may be achieved.

A method for determining a GP is provided below based on the embodiment shown in FIG. 6. The method includes the following operations.

At S601, when accessing the cell, the UE obtains a broadcast GP length from the network side.

About S601, refer to S501.

The length of the GP may be described by the number of consecutive symbols or the proportion (also called the ratio), which is because the total time length of the sub-frame composed of the uplink time slot, the downlink time slot and the GP is fixed. In the implementation process, the network side may include the base station. Of course, for those skilled in the art, the network side may also be realized by other network elements, which will not be repeated herein. By taking that the length of the GP is described by the ratio for example, the ratio may be determined by the base station; for example, the base station may determine the length of the GP based on the requirement for the maximum GP, or the base station determines the length of the GP according to the coverage distance of the cell.

At S602, the network side first performs physical resource scheduling and allocation for uplink UE according to the information of the UE to which uplink scheduling is needed to be performed in the current sub-frame.

At S603, the network side determines the size of the GP needed to be reserved for UE that are scheduled for uplink transmission in the current sub-frame according to the location information of these UE.

The location information of the UE is not necessarily accurate location information. The location information of the UE may adopt the measurement feedback information of the UE or the information about the TA of the UE, so the network side may determine, on the basis of the measurement feedback information of the UE, the size of the GP reserved. The network side may also determine the value of the TA by using the existing method for determining TA, so that the size of the GP required at the current position of the UE is determined.

At S604, when scheduling downlink data of the current sub-frame, the network side determines the number of consecutive symbols of downlink UE according to a requirement of the uplink UE, which has been scheduled on the same frequency band, for the GP.

The requirement for the GP is the time length that the network side reserves for the GP.

The downlink may be an arbitrary number of consecutive symbols, and may also correspond to some ratios. When the same frequency band corresponds to the scheduling of multiple pieces of uplink UE, the GP length of the uplink UE which requires the largest time length of the GP is taken as a standard.

At S605, the network side indicates the duration of its time domain to the downlink UE through signaling.

In the implementation process, it is feasible to add N bits in downlink control information to indicate. For example, the N bits are used for indicating one of multiple configurations, or indicating the number of the consecutive symbols in the time domain. The duration (time length) of the downlink UE in the sub-frame depends on the uplink UE scheduled on the same frequency band, and scheduling conditions of the uplink sub-frame corresponding to each sub-frame may be different, so a dynamic indication is more applicable when the downlink time length is variable.

At S606, during the downlink transmission, the UE determines, according to the configuration of the network side, the duration of the transmission time domain of the current sub-frame to receive the downlink service sent by the base station.

After the UE accesses the cell and the terminal side accesses the cell, the UE receives at least one of the following information sent by the network side: the duration of the uplink and downlink services or the time length of the GP. The UE determines, according to the information, the duration for receiving the downlink service. The UE receives the downlink service according to the duration of the downlink service.

The time length of the uplink time slot is variable in a first embodiment, and the time length of the downlink time slot is variable in a second embodiment. Whether the time length of the uplink time slot is variable or the time length of the downlink time slot is variable may be notified by the base station in a broadcast way or determined according to the transmission of the sub-frame. For example, the uplink time slot of the current sub-frame transmits only the content related to control information and measurement information, and the downlink transmission includes only service information, then it may be fixed that the time sequences of the uplink time slot are kept aligned, and the time length of the downlink time slot is dynamically adjusted according to the time length of the GP. Conversely, if the current sub-frame is in an uplink service channel transmission mode, that is, the downlink transmission includes only the downlink control information instead of the service information, then it may be adopted that the time length of the downlink time slot is kept fixed, and the time length of the uplink time slot is dynamically adjusted according to the time length of the GP.

In the above embodiments of the disclosure, the base station configures the UE specific GP length for the UE according to the information indicating the location of the UE, for example, based on the information about TA of the UE. The base station dynamically adjusts, on the basis of the UE specific GP length, the duration of the uplink or downlink service in the sub-frame. The base station notifies the UE of the duration of the service or the length of the GP configured. The UE performs the corresponding uplink and downlink transmissions according to the configuration of the base station.

Compared with the conventional art, the embodiments of the disclosure have the following advantages: the GP length needed to be reserved for scheduling the UE to perform the uplink transmission is determined according to the information indicating the location of the UE, so that the duration of the uplink or downlink transmission is dynamically adjusted, thereby making full use of resources, and further avoiding a waste of resources.

Fourth Embodiment

Based on the above embodiments, the present embodiment of the disclosure provides a device for determining a GP. In the implementation process, the device may be realized by the network device, for example, the base station. All of the first determining unit, the second determining unit, the notifying unit and other units included in the device, and the modules included in the units may be realized by the processors in the device; of course, they may also be realized by logic circuits. In the implementation process, the processors may be a Central Processing Unit (CPU), a Micro Processor Unit (MPU), a Digital Signal Processor (DSP) or a Field Programmable Gate Array (FPGA).

Figure 7:
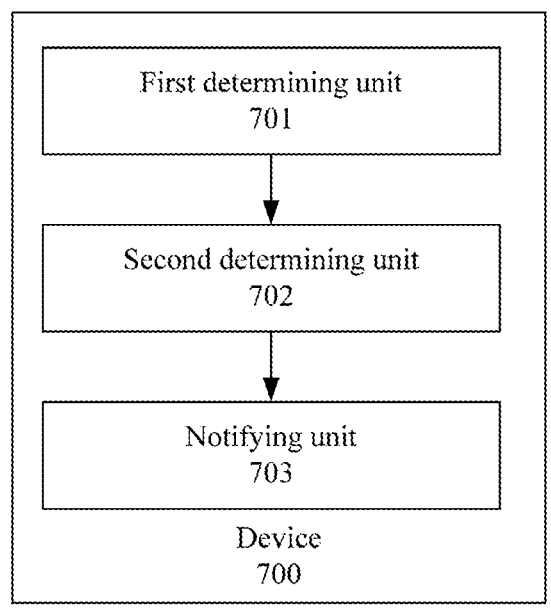
FIG. 7 is a structure diagram of a device for determining a GP in a fourth embodiment of the disclosure.

FIG. 7 is a structure diagram of the device for determining a GP in a fourth embodiment of the disclosure. As shown in FIG. 7, the device 700 includes: a first determining unit 701, a second determining unit 702 and a notifying unit 703.

The first determining unit 701 is configured to determine, according to information indicating a location of UE, the time length of the GP for the UE.

The second determining unit 702 is configured to determine, on the basis of the time length of the GP of the UE, the duration of the uplink or downlink service in the sub-frame.

The notifying unit 703 is configured to notify the UE of at least one of the following information: the duration of the uplink service, the duration of the downlink service or the time length of the GP.

In other embodiments of the disclosure, the second determining unit is configured to determine the time length of the uplink time slot or the time length of the downlink time slot in the sub-frame on the basis of the time length of the GP of the UE; correspondingly, the notifying unit is configured to notify the UE of the time length of the uplink time slot, or the time length of the downlink time slot or the time length of the GP.

In other embodiments of the disclosure, the second determining unit includes a first determining module and a second determining module.

The first determining module is configured to determine that the time lengths of the downlink time slots are the same and time sequences of the downlink time slots are aligned.

The second determining module is configured to determine the time length of the uplink time slot according to the time length of the GP, the total time length of the sub-frame and the time length of the downlink time slot.

In other embodiments of the disclosure, the second determining unit includes a third determining module and a fourth determining module.

The third determining module is configured to determine that the time lengths of the uplink time slots are the same and time sequences of the uplink time slots are aligned.

The fourth determining module is configured to determine the time length of the downlink time slot according to the time length of the GP, the total time length of the sub-frame and the time length of the uplink time slot.

In other embodiments of the disclosure, the first determining unit is configured to determine the time length of the GP according to the location information, or the information about TA or the measurement feedback information of the UE.

In other embodiments of the disclosure, the time length of the GP is represented by the number of consecutive symbols or the proportion.

In other embodiments of the disclosure, the device further includes: a third determining unit, which is configured to determine the ratio according to the communication standard or the customized rule.

In other embodiments of the disclosure, the notifying unit is configured to indicate the information by N bits added in the control channel; the N bits are used for carrying at least one of the following information: the duration of the uplink service, the duration of the downlink service or the time length of the GP;

or the notifying unit is configured to indicate the information to the UE through the semi-static signaling; the semi-static signaling carries at least one of the following information: the duration of the uplink service, the duration of the downlink service or the time length of the GP.

It is to be noted that the description of the embodiment of the device is similar to the description of the embodiment of the method, and the embodiment of the device has the beneficial effects similar to that of the embodiment of the method, so it will not be repeated herein. The technical details not disclosed in the embodiment of the device of the disclosure may be understood by referring to the description of the embodiment of the method, so they will not be repeated herein for saving space.

Fifth Embodiment

Based on the above embodiments, the present embodiment of the disclosure provides a method for determining a GP. The method is applied to the terminal side, for example, the terminal. The functions realized by the method may be implemented by calling the program codes by the processor in the network device. Of course, the program codes may be stored in the computer storage medium. It is apparent that the terminal at least includes the processor and the storage medium.

Figure 8:
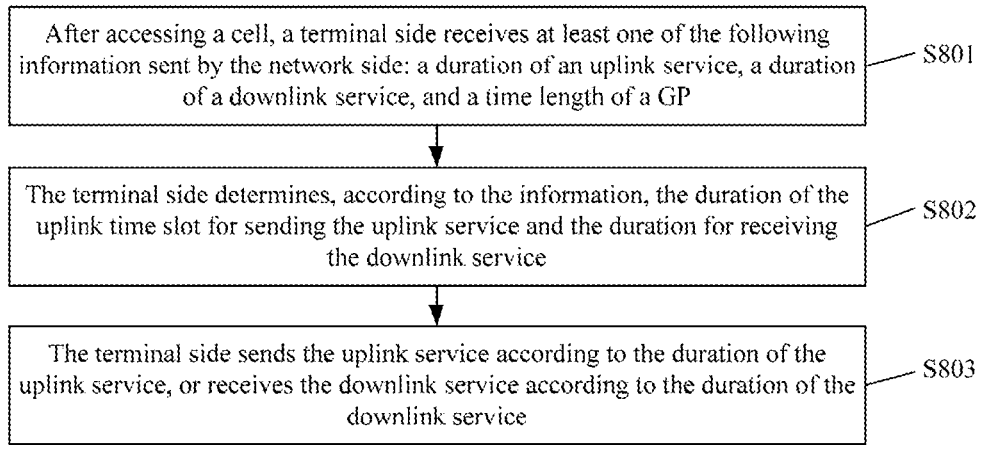
FIG. 8 is a flowchart of a method for determining a GP in a fifth embodiment of the disclosure.

FIG. 8 is a flowchart of the method for determining a GP in a fifth embodiment of the disclosure. As shown in FIG. 8, the method includes the following operations.

At S801, after accessing the cell, the terminal side receives at least one of the following information sent by the network side: the duration of the uplink service, the duration of the downlink service or the time length of the GP.

At S802, the terminal side determines, according to the information, the duration of the uplink time slot for sending the uplink service and the duration for receiving the downlink service.

At S803, the terminal side sends the uplink service according to the duration of the uplink service, or receives the downlink service according to the duration of the downlink service.

In the present embodiment of the disclosure, the operation that the terminal side receives at least one of the following information sent by the network side may include: the terminal side receives the information sent by the network side through the N bits added in the control channel; the N bits are used for carrying at least one of the following information: the duration of the uplink service, the duration of the downlink service or the time length of the GP; or the terminal side receives the semi-static signaling sent by the network side; the semi-static signaling carries at least one of the following information: the duration of the uplink service, the duration of the downlink service or the time length of the GP.

In an embodiment of the disclosure, the operation that the terminal determines, according to the information, the duration of the uplink time slot for sending the uplink service and the duration for receiving the downlink service may include:

the terminal side determines that the time lengths of the downlink time slots are the same and time sequences of the downlink time slots are aligned;

the terminal side determines a start position of the uplink time slot according to the time length of the GP, the total time length of the sub-frame and the time length of the downlink time slot; and the terminal side sends the uplink service from the start position of the uplink time slot.

In an embodiment of the disclosure, the operation that the terminal determines, according to the information, the duration of the uplink time slot for sending the uplink service and the duration for receiving the downlink service may include:

the terminal side determines that the time lengths of the uplink time slots are the same and time sequences of the uplink time slots are aligned;

the terminal side determines a start position of the downlink time slot according to the time length of the GP, the total time length of the sub-frame and the time length of the uplink time slot; and the terminal side receives the downlink service from the start position of the uplink time slot.

Sixth Embodiment

The present embodiment provides a terminal. All of the units included in the terminal and the modules included in the units may be realized by the processors in the terminal; of course, they may also be realized by the logic circuits. In the implementation process, the processors may be the CPU, the MPU, the DSP or the FPGA.

Figure 9:
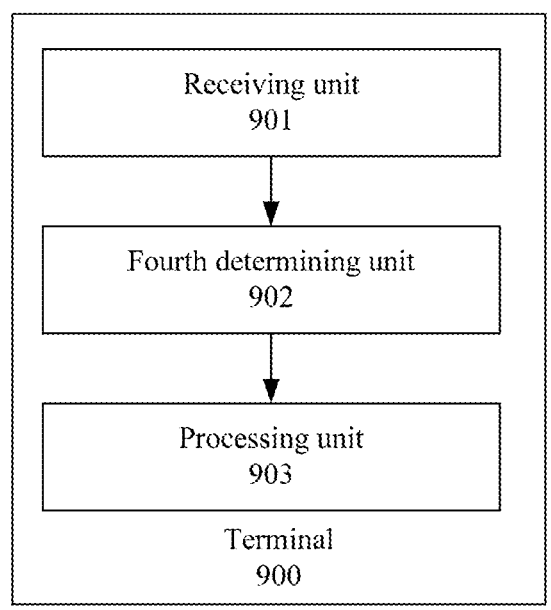
FIG. 9 is a structure diagram of a terminal in a sixth embodiment of the disclosure.

FIG. 9 is a structure diagram of the terminal in a sixth embodiment of the disclosure. As shown in FIG. 9, the terminal 900 includes: a receiving unit 901, a fourth determining unit 902 and a processing unit 903.

The receiving unit 901 is configured to, after accessing the cell, receive at least one of the following information sent by the network side: the duration of the uplink service, the duration of the downlink service or the time length of the GP.

The fourth determining unit 902 is configured to determine, according to the information, the duration of the uplink time slot for sending the uplink service and the duration for receiving the downlink service.

The processing unit 903 is configured to send the uplink service according to the duration of the uplink service, or receive the downlink service according to the duration of the downlink service.

In an embodiment of the disclosure, the first receiving unit is configured to receive the information sent by the network side through the N bits added in the control channel; the N bits are used for carrying at least one of the following information: the duration of the uplink service, the duration of the downlink service or the time length of the GP; or the first receiving unit is configured to receive the semi-static signaling sent by the network side; the semi-static signaling carries at least one of the following information: the duration of the uplink service, the duration of the downlink service or the time length of the GP.

In an embodiment of the disclosure, the fourth determining unit includes a fifth determining module, a sixth determining module and a sending module.

The fifth determining module is configured to determine that the time lengths of the downlink time slots are the same and time sequences of the downlink time slots are aligned.

The sixth determining module is configured to determine the start position of the uplink time slot according to the time length of the GP, the total time length of the sub-frame and the time length of the downlink time slot.

The sending module is configured to send the uplink service from the start position of the uplink time slot.

In an embodiment of the disclosure, the fourth determining unit includes a seventh determining module, an eighth determining module and a receiving module.

The seventh determining module is configured to determine that the time lengths of the uplink time slots are the same and time sequences of the uplink time slots are aligned.

The eighth determining module is configured to determine the start position of the downlink time slot according to the time length of the GP, the total time length of the sub-frame and the time length of the uplink time slot.

The receiving module is configured to receive the downlink service from the start position of the uplink time slot.

It is to be noted that the description of the embodiment of the terminal is similar to the description of the embodiment of the method, and the embodiment of the terminal has the beneficial effects similar to that of the embodiment of the method, so it will not be repeated herein. The technical details not disclosed in the embodiment of the terminal of the disclosure may be understood by referring to the description of the embodiment of the method, so they will not be repeated herein for saving space.

It is to be noted that in the present embodiment of the disclosure, if the method for determining a GP is implemented by software function modules, and the software function modules are sold or used as independent products, they can also be stored in a computer readable storage medium. Based on this understanding, the technical solutions in the embodiments of the disclosure substantially or the part making a contribution to the traditional art can be embodied in the form of software product; the computer software product is stored in a storage medium and includes a number of instructions to make a computer device (which can be a personal computer, a server or a network device, etc.) perform all or part of the method in each embodiment of the disclosure. The above storage media include: a USB flash disk, a mobile hard disk, an ROM, a magnetic disk or a compact disc, and other media which can store program codes. In this way, the disclosure is not limited to any particular combination of hardware and software.

Correspondingly, the embodiments of the disclosure provide a computer storage medium having stored thereon computer executable instructions configured to execute the method for determining a GP provided by the embodiment in the first aspect and the embodiment in the second aspect.

Correspondingly, the embodiments of the disclosure provide a device for determining a GP, which includes the first processor and the first storage medium for storing executable instructions. The first processor is configured to execute the stored executable instructions. The executable instructions include the following operations.

The time length of the GP is determined for the UE according to the information indicating the location of the UE.

The duration of the uplink or downlink service in the sub-frame is determined on the basis of the time length of the GP of the UE.

At least one of the following information is notified to the UE: the duration of the uplink service, the duration of the downlink service or the time length of the GP.

Correspondingly, the embodiments of the disclosure provide a terminal, which includes: the second processor and the second storage medium for storing the executable instructions. The second processor is configured to execute the stored executable instructions. The executable instructions include the following operations.

After the terminal accesses the cell, at least one of the following information sent by the network side is received: the duration of the uplink service, the duration of the downlink service or the time length of the GP.

The duration of the uplink time slot for sending the uplink service and the duration for receiving the downlink service are determined according to the information.

The uplink service is sent according to the duration of the uplink service, or the downlink service is received according to the duration of the downlink service.

It should be understood that "one embodiment" or "an embodiment" mentioned throughout the specification means that specific features, structures or characteristics related to the embodiments are included in at least one embodiment of the disclosure. So, "in one embodiment" or "in an embodiment" mentioned throughout the entire specification is not necessarily the same embodiment. Moreover, these specific features, structures or characteristics may be combined in one or more than one embodiment in any proper way. It should be understood that, in a variety of embodiments of the disclosure, the serial numbers of processes do not mean an execution sequence. The execution sequence of each process should be determined according to its function and inherent logic, but should not form any limit to the implementation process of the embodiments of the disclosure. The sequence numbers of the embodiments of the disclosure are just for describing, instead of representing superiority-inferiority of the embodiments.

It is to be noted that, in this application, the term "include" or "comprise" or any other variant is intended to cover nonexclusive including, so that a process, a method, and an object or a device including a series of elements include not only these elements, but other elements not listed clearly, or include elements inherent in them. In the absence of more limits, for the element limited by the statement "include a . . . ", there may be another same element in the process, the method, and the object or the device including the element.

In several embodiments provided in the application, it should be understood that the disclosed device and method can be realized in other ways. The embodiment of the device described above is only schematic. The division of the units is only a division of logical functions, and there can be other dividing modes during the actual implementation, for example, multiple units or components can be combined or integrated to another system, or some features can be ignored or are not executed.

Moreover, coupling, direct coupling, or communication connection among the shown or discussed components can be implemented through indirect coupling or communication connection of some interfaces, devices, or units, and can be in an electrical form, a mechanical form or other forms.

The above units described as separate parts may be or may not be separated physically. The parts shown as the units may be or may not be the physical units, and can be either located in a place or distributed on multiple network units. A part or all of the units can be selected, according to actual needs, to achieve the purposes of the solutions of the embodiments.

Moreover, all the functional units in the embodiments of the disclosure can be integrated on a processing unit; or each of the functional units serves as a unit separately; or two or more than two units are integrated in a unit. The integrated unit can be realized in a form of hardware or in a form of hardware and software functional unit.

Those of ordinary skill in the art may understand that: all or part of the steps for implementing the embodiment of the method can be completed by virtue of hardware related to a program instruction. The program can be stored in computer readable storage media; when the program is executed, the steps of the embodiment of the method are performed. The storage media include: a mobile storage device, a Read-Only Memory (ROM), a magnetic disk or a compact disk, and other media which may store the program codes.

Or, if the integrated unit is implemented by software function modules, and the software function modules are sold or used as independent products, they can also be stored in a computer readable storage medium. Based on this understanding, the technical solutions in the embodiments of the disclosure substantially or the part making a contribution to the traditional art can be embodied in the form of software product; the computer software product is stored in a storage medium and includes a number of instructions to make a computer device (which can be a personal computer, a server or a network device, etc.) perform all or part of the method in each embodiment of the disclosure. The above storage media include: a mobile storage device, an ROM, a magnetic disk or a compact disk, and other media which may store the program codes.

The above is only the specific implementation mode of the disclosure and not intended to limit the protection scope of the disclosure. Any change or replacement that those skilled in the art can think of easily in the scope of technologies disclosed by the disclosure shall fall within the protection scope of the disclosure. So, the protection scope of the disclosure is subject to the protection scope of the claims.

INDUSTRIAL APPLICABILITY

In the embodiments of the disclosure, the network side determines, according to the information indicating the location of the UE, the time length of the GP for the UE, the network side determines, on the basis of the time length of the GP of the UE, the duration of the uplink or downlink service in the sub-frame, and the network side notifies the UE of at least one of the following information: the duration of the uplink service or duration of the downlink service, and the time length of the GP; in such a manner, the duration of the uplink or downlink transmission may be adjusted dynamically, thereby making full use of resources, and further avoiding a waste of resources.

The invention claimed is:

1. A method for determining a Guard Period (GP), comprising:
   after a terminal side accesses a cell, receiving, by the terminal side, at least one of the following information sent by a network side: a duration of an uplink service, a duration of a downlink service or a time length of a GP;
   determining, by the terminal side, a duration for sending the uplink service and a duration for receiving the downlink service according to the received information; and
   sending, by the terminal side, the uplink service according to the determined duration of the uplink service, or receiving the downlink service according to the determined duration of the downlink service,
   wherein receiving, by the terminal side, at least one of the following information sent by the network side comprises:
   receiving, by the terminal side, the information sent by the network side through N bits in a control channel, wherein the N bits are used for carrying at least one of the following information: the duration of the uplink service, the duration of the downlink service or the time length of the GP, and N is a positive integer greater than 0; or
   receiving, by the terminal side, semi-static signaling sent by the network side, wherein the semi-static signaling carries at least one of the following information: the duration of the uplink service, the duration of the downlink service or the time length of the GP.

2. The method according to claim 1, wherein determining, by the terminal side, the duration for sending the uplink service and the duration for receiving the downlink service according to the received information comprises:
   determining, by the terminal side, that durations of downlink services are the same and time sequences of the downlink services are aligned;
   determining, by the terminal side, a start position of the uplink service according to the time length of the GP, a total time length of the sub-frame and the duration of the downlink service; and
   sending, by the terminal side, the uplink service from the start position.

3. The method according to claim 2, wherein the alignment of the time sequences of the downlink services refers to that transmission start times of the downlink services are aligned and transmission end times of the downlink services are aligned.

4. The method according to claim 1, wherein determining, by the terminal side, the duration for sending the uplink service and the duration for receiving the downlink service according to the received information comprises:
   determining, by the terminal side, that durations of uplink services are the same and time sequences of the uplink services are aligned; and
   determining, by the terminal side, a start position of the downlink service according to the time length of the GP, a total time length of the sub-frame and the duration of the uplink service; and receiving, by the terminal side, the downlink service from the start position.

5. The method according to claim 4, wherein the alignment of the time sequences of the uplink services refers to that transmission start times of the uplink services are aligned and transmission end times of the uplink services are aligned.

6. The method according to claim 1, wherein the duration of the uplink or downlink service is represented by at least any one of the followings: a number of symbols, a position of a start symbol or a position of a terminal symbol.

7. A terminal, comprising:
a processor; and
a memory for storing instructions executable by the processor,
wherein the processor is arranged to:
after the terminal accesses a cell, receive at least one of the following information sent by a network side: a duration of an uplink service, a duration of a downlink service or a time length of a GP;
determine a duration for sending the uplink service and a duration for receiving the downlink service according to the received information; and
send the uplink service according to the determined duration of the uplink service, or receive the downlink service according to the determined duration of the downlink service,
wherein the processor is specifically arranged to:
receive the information sent by the network side through N bits in a control channel, wherein the N bits are used for carrying at least one of the following information: the duration of the uplink service, the duration of the downlink service or the time length of the GP, and N is a positive integer greater than 0; or
receive semi-static signaling sent by the network side, wherein the semi-static signaling carries at least one of the following information: the duration of the uplink service, the duration of the downlink service or the time length of the GP.

8. The terminal according to claim 7, wherein determining the duration for sending the uplink service and the duration for receiving the downlink service according to the received information comprises:
determining that durations of downlink services are the same and time sequences of the downlink services are aligned;
determining a start position of the uplink service according to the time length of the GP, a total time length of the sub-frame and the duration of the downlink service; and
sending the uplink service from the start position.

9. The terminal according to claim 7, wherein determining the duration for sending the uplink service and the duration for receiving the downlink service according to the received information comprises:
determining that durations of uplink services are the same and time sequences of the uplink services are aligned;
determining a start position of the downlink service according to the time length of the GP, a total time length of the sub-frame and the duration of the uplink service; and
receiving the downlink service from the start position.

10. The terminal according to claim 7, wherein the duration of the uplink or downlink service is represented by at least any one of the followings: a number of symbols, a position of a start symbol or a position of a terminal symbol.

11. A non-transitory computer storage medium having stored thereon computer executable instructions configured to execute a method for determining a Guard Period (GP), the method comprising:
after a terminal side accesses a cell, receiving, by the terminal side, at least one of the following information sent by a network side: a duration of an uplink service, a duration of a downlink service or a time length of a GP;
determining, by the terminal side, a duration for sending the uplink service and a duration for receiving the downlink service according to the received information; and
sending, by the terminal side, the uplink service according to the determined duration of the uplink service, or receiving the downlink service according to the determined duration of the downlink service,
wherein receiving, by the terminal side, at least one of the following information sent by the network side comprises:
receiving, by the terminal side, the information sent by the network side through N bits in a control channel, wherein the N bits are used for carrying at least one of the following information: the duration of the uplink service, the duration of the downlink service or the time length of the GP, and N is a positive integer greater than 0; or
receiving, by the terminal side, semi-static signaling sent by the network side, wherein the semi-static signaling carries at least one of the following information: the duration of the uplink service, the duration of the downlink service or the time length of the GP.

12. The non-transitory computer storage medium according to claim 11, wherein determining, by the terminal side, the duration for sending the uplink service and the duration for receiving the downlink service according to the received information comprises:
determining, by the terminal side, that durations of downlink services are the same and time sequences of the downlink services are aligned;
determining, by the terminal side, a start position of the uplink service according to the time length of the GP, a total time length of the sub-frame and the duration of the downlink service; and
sending, by the terminal side, the uplink service from the start position.

13. The non-transitory computer storage medium according to claim 11, wherein the duration of the uplink or downlink service is represented by at least any one of the followings: a number of symbols, a position of a start symbol or a position of a terminal symbol.

14. The non-transitory computer storage medium according to claim 11, wherein determining, by the terminal side, the duration for sending the uplink service and the duration for receiving the downlink service according to the received information comprises:
determining, by the terminal side, that durations of uplink services are the same and time sequences of the uplink services are aligned; and
determining, by the terminal side, a start position of the downlink service according to the time length of the GP, a total time length of the sub-frame and the duration of the uplink service; and
receiving, by the terminal side, the downlink service from the start position.

* * * * *